Figure 1:
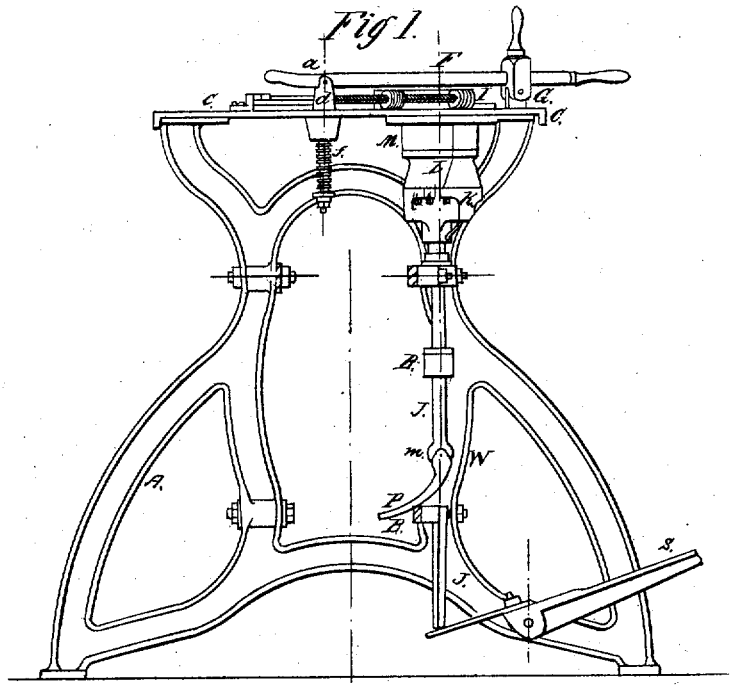

2 Sheets--Sheet 1.

J. C. TOUZET.

Improvement in Apparatus for Goring Uppers.

No. 5,075. Reissued Sep. 24, 1872.

Witnesses.

Inventor.

AM. PHOTO-LITHOGRAPHIC CO. N.Y. (OSBORNE'S PROCESS.)

J. C. TOUZET.

Improvement in Apparatus for Goring Uppers.

No. 5,075. Reissued Sep. 24, 1872.

Witnesses.

Papillon

A. Davenport

Inventor.

J. Touzet

AM. PHOTO-LITHOGRAPHIC CO. N.Y. (OSBORNE'S PROCESS.)

UNITED STATES PATENT OFFICE.

JULES CONSTANT TOUZET, OF PARIS, FRANCE.

IMPROVEMENT IN APPARATUS FOR GORING UPPERS.

Specification forming part of Letters Patent No. 85,492, dated December 29, 1868; reissue No. 5,075, dated September 24, 1872.

*To all whom it may concern:*

Be it known that I, JULES CONSTANT TOUZET, of Paris, France, have invented an Apparatus for Manufacturing Shoes, Gaiters, &c.; and I do hereby declare the following to be a full, clear, and exact description of the same.

My invention consists of mechanism, fully described hereafter, for performing certain operations in the manufacture of gaiters, &c., that have hitherto been performed by hand.

The object of my improvement is to insert between the leather-vamp and the lining of gaiter-shoes the elastic goring, and paste it there ready for stitching. The mechanism and methods of operation invented by me will accomplish this object in such a manner, that any number of vamps which may be lined and have their gores inserted by its use will be similar to each other, and so produce uniform appearance in the shoes that are made from them. The principal parts of my machine by which this desirable result is accomplished are: First, guides which determine the positions of the different parts of the vamp and lining in reference to the elastic gores, so that any number of vamps worked upon the same-shaped guides will always be similar in the positions of the various parts to each other. Secondly, the use of clamps which hold down the vamp or lining to be operated upon, which clamps always come substantially to the same place, in their operation, as often as they may be used. Thirdly, the use of a creaser or apparatus for folding back the edges of the gore-shaped spaces in the vamp or lining, or both; so that when the space for the insertion of the elastic goring has been fixed by the folding of the leather, or of the lining which borders the space, the shape and size of that space will be what is required for a shoe-gore, and have its edges neatly folded in. Fourthly, the application of a pressure-clamp to the edges where the leather and lining have the elastic goring between them, and where they are to be cemented together preparatory to sewing them. Fifthly, to facilitate the operation of bringing together these different parts, I have a mechanical folding apparatus which, by the movements of an iron slide, folds back all parts of the edges, either of the leather or of the lining, at the same time; and I also still further facilitate the operation by heating the folding apparatus with gas, so as to fix the fold more quickly than could be done without the use of some artificial heat.

In order to enable others skilled in the art to make and use my invention, I will now proceed to describe its construction and operation, reference being had to the accompanying drawing which forms a part of this specification, and in which—

Figure 2:
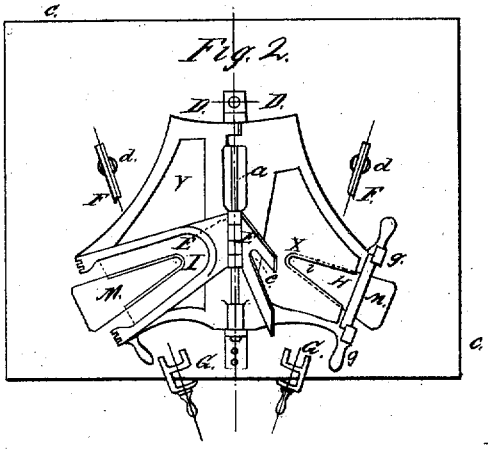
Figure 3:
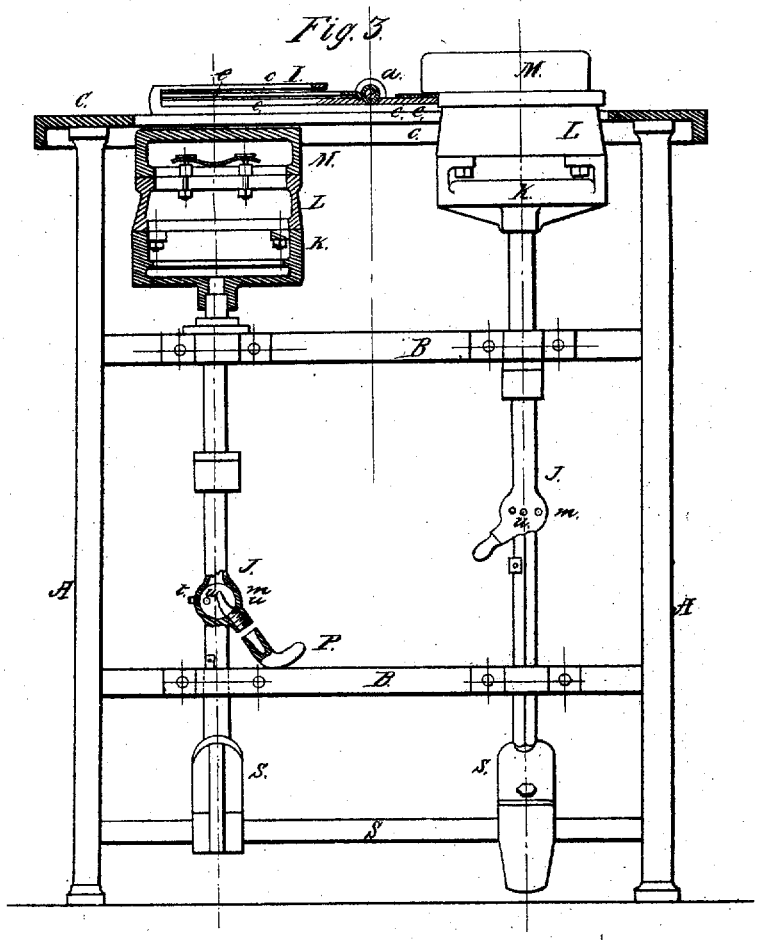
Figure 4:
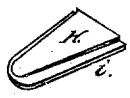
Figure 5:
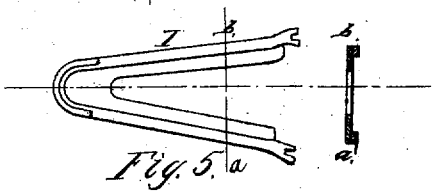

Figure 1, Sheet No. 1, is a side elevation, partly in section, of my apparatus; Figure 2, a plan view; Figure 3, Sheet No. 2, a front elevation, partly in section; Figure 4, a detached view; and Figure 5 is a view of the creaser I in plan and in section.

The two side frames A A of the apparatus are connected by cross-pieces B B, and support a table, C, to a rod, *a*, on the upper side of which are hinged two plates, D D′, and two clamps, E E′. In the table C are two triangular openings, *c c′*, Fig. 3, and in the plates and clamps D D′ and E E′ are triangular openings *e e′*, which (when the said plates are folded down upon the table C) are directly above and correspond to the openings *c c′*, and correspond in shape with the shape of the gore to be inserted. Through the table C passes a rod, *d*, a shoulder on which limits its downward movement, and on the rod, below the top, is coiled a spring, *f*, which is confined between nuts on the lower end of the rod and the table C, and to the upper end of this rod is jointed a lever, F. Near the edge of the table is jointed an adjustable catch, G, for the reception of the lever F, as described hereafter. The triangular piece H, Fig. 4, is a guide for the purpose of fixing the position of the vamp and lining in reference to the elastic gore. This guide is set into the gore-shaped openings in the plates D D′, as shown in Fig. 2, where it is in place in plate D′; and the base or broader part of it fits into that opening, while the narrower upper part of it projects above the level of the plate, and there constitutes a guide for the purpose intended. This guide, after having performed its office, is withdrawn from the machine, as will more particularly be described. The creaser I is a thin plate of metal, having a gore-shaped opening cut out of it for the purpose of folding the edge of the vamp or lining over the edges of that opening, so as to leave a space of the desired size and shape for the elastic goring in the vamp or lining after the leather or cloth has been folded. This creaser is detachable from the machine, as is also the guide D, and is removed when it has performed its office. When applied it is set with its inside edges corresponding with the edges of the gore-shaped opening in the plates D D′, and kept in position by a steady-pin or other suitable notch and projection. To shafts J, which slide without turning in guides on the cross-pieces B B, are secured hollow frames K, perforated at the top, and having lugs to which are secured boxes L, and on the latter rest irons M, which irons fit the openings in the plates D D′, and are so arranged as to be capable of being slid on the top of the box L toward the narrower end of the box far enough to project a short distance over the upper surface of the plates D D′, and so fold the material which is by their lateral movement flattened down over the creaser, whose thin metal thus is brought between the two thicknesses of the material folded over its edges. The upper portion of each end J is hollow, and near the lower end it is enlarged in diameter to form a hollow sphere, *m*, the latter communicating, through the hollow shaft, with the box K, and into this sphere (to openings *w*, in which are adapted detachable stoppers *t*,) extends an inclined tube, *n*, the inner end of which is bent upward, its outer end being connected to a flexible gas-pipe, P. To a rod, *s*, extending between the two side frames, are hung two treadles, S, each of which extends beneath the lower end of one of the shafts J. Gas is admitted to the tube *n*, and, flowing upward in the hollow portion of the shaft J, creates a current, which causes the air to pass into the opening *w* and upward with the gas, the mixture of air and gas being ignited where it passes from the openings in the frame K, so that the box L above the frame and the iron M upon this box are quickly heated, and are maintained at a uniform temperature. By regulating the admission of gas, and the amount of air which passes into the sphere *m*, such a uniform mixture of the gases may be obtained as will insure a complete combustion and produce a flame of any required degree of intensity, and without the emission of smoke or injurious or disagreeable vapors or odors.

*Operation.*

When the machine is to be used, the plates D and D′ are flat on the table, as shown in Fig. 2. Into each of the gore-shaped openings in these plates a guide, H, is fitted, the one for the leather and the other for the lining. The lining and the vamp, having first been cut to the required shape, with the angular openings in them, are then laid on the plates D and D′ with the interior edges of the triangular openings in contact with the edges of the projection *i* on the guide H. The clamps E and E′ are then brought down upon the leather on the one side and the lining on the other and secured there by the catches *g*. When the materials are thus secured in position, the guides *h* must be withdrawn, and then the edges of the material around the opening in the plate will project over and partly cover those openings, as shown in the dotted line in Fig. 2. The extent to which these edges project over the openings is the width that will be folded back in the subsequent operation of the machine. The creasers I are then laid on top of the materials on both sides, and, as these creasers are of the same size with the openings, it is apparent that the material will project into the triangular spaces left by cutting out the thin metal of the creasers, as described, and as is shown in Fig. 2, on the left side of the diagram, at M. In this situation the treadles of the machine are worked by the foot, and the irons M are elevated into the position as shown in Fig. 3, on the right side of that figure, at M, the similar apparatus on the left side being shown before it has been elevated. Inasmuch as the vamp and lining project over the openings to the extent required for folding, as before described, and inasmuch as the iron M fills the hole thus partly covered by the leather or lining, it is apparent that when the iron M is lifted through that hole it will turn the edges of the flexible material from the horizontal to a perpendicular position, folding them up over the edge of the creaser I, which is on top of them. When the iron M is raised so far as that it can be slipped lengthwise, it is then pushed in the direction of the point of the opening and, necessarily, folds down the leather or cloth which it had first raised up as it was itself elevated through the opening, and the iron being heated by the gas it gives to the material a permanent set. The creasers I are then withdrawn from under the edges of the irons, and the irons slipped back to their original position, and lowered through the openings out of the way, leaving the vamp on one side and lining on the other, with the edges of the triangular openings folded back, as required. The elastic goring, having been cemented on both sides along its edges so far back from the edges as they are intended to be caught between the vamp and the lining, is then applied either to the vamp or lining, so as to cover the gore-shaped opening in the vamp or lining, and a narrower strip beyond the edges of the openings, and one of the plates D D′ on which the elastic gore has not been laid is folded over onto the other one, when the edges of the openings in the two plates will exactly correspond with each other, and, consequently, the folded edges of the vamp will come exactly above the folded edges of the lining, and will confine the cemented elastic goring between them, one of the plates thus forming the pressure-plate, in addition to its other offices. The lever F is then pressed down upon the upper side of the plate, which has been folded over so as to force the edges of the vamp and lining into close contact with the cemented elastic goring, and the heat arising from the iron M will aid in drying the cement, so that the finished vamp can be speedily removed.

It will be seen that the spring *f* will permit the inner end of the lever to rise to a limited extent when the material between the plates is of unusual thickness. It is apparent that the operation above described will result in the folding in of the edges both of the leather vamp and of the lining, and in the insertion between them of the elastic gore; but in many cases it is not necessary or desirable to fold in the edges of the leather vamp, and in such cases that part of the operation before described will, of course, be dispensed with, and the elastic gore will be applied directly to the leather vamp with its raw edges without folding.

If the machine is to be used only for vamps the edges of which are not to be folded in, it is apparent that the apparatus for performing the folding operations of one-half of the machine may be dispensed with, and all that will be necessary to retain will be the hinged plate for pressing down the leather upon the edge of the elastic goring when it has been applied to it; and it is also apparent that the mechanical folding-irons may be dispensed with and the edges folded by a hand-folder, and that the artificial heating may be dispensed with, in which cases the operation will be done more slowly.

Without confining myself to the precise construction and arrangement of parts shown and described, I claim as my invention, and desire to secure by Letters Patent—

1. A plate or table, substantially as described, upon which the lining or the vamp may be laid, in combination with a clamp or clamps so constructed that they may be lifted up to permit the vamp or lining to be placed upon the plate or table and then brought down to make a pressure upon the vamp or lining on each side of the space where the elastic goring is to be inserted, for the purpose of keeping the vamp or lining in position for folding and for the application of the elastic goring, substantially as described.

2. In combination with the plate to support the vamp or lining to be operated on, I claim the pressure-plate applied to the edges to be cemented, for the purpose of promoting adhesion between the parts, substantially as described.

3. I claim the arrangement of the clamps and pressure-plates, substantially as described, so that as they are lowered upon the materials they will always come to the same place on the plate on which the materials are laid, substantially as described.

4. I claim a guide, substantially as described, which, when placed on the plate of the machine, presents an edge or border against which the vamp or lining may be laid, for the purpose of fixing the position of the same in reference to the elastic goring which is to be inserted, substantially as described.

5. I claim, in combination with the clamps for holding down the vamp or lining, the creaser or apparatus for determining the lines at which the lining or vamp is to be folded, substantially as described.

6. I claim the mechanical folding-irons, for folding over the edges of the vamp or lining, substantially as described.

7. I claim the folding-irons, artificially heated for the purpose described, substantially as described.

J. TOUZET.

Witnesses:
H. DAVENPORT,
TAPILLO.